United States Patent

Penna

[11] Patent Number: 5,867,143
[45] Date of Patent: Feb. 2, 1999

[54] DIGITAL IMAGE CODING

[75] Inventor: David E. Penna, Redhill, United Kingdom

[73] Assignee: U.S. Philips Corporation, New York, N.Y.

[21] Appl. No.: 545,475

[22] Filed: Oct. 19, 1995

[30] Foreign Application Priority Data

Oct. 28, 1994 [GB] United Kingdom ............... 9421770

[51] Int. Cl.[6] ........................................ G09G 5/22
[52] U.S. Cl. ...................... 345/141; 345/144; 382/179
[58] Field of Search ...................... 345/141, 143, 345/144; 382/128, 129, 130, 112, 177, 179, 180, 243, 291, 301

[56] References Cited

U.S. PATENT DOCUMENTS

| | | | |
|---|---|---|---|
| 4,517,654 | 5/1985 | Carmean ................................ | 364/521 |
| 4,908,610 | 3/1990 | Yamamuro et al. .................... | 340/703 |
| 4,937,565 | 6/1990 | Suwannukul ........................... | 340/735 |
| 5,065,446 | 11/1991 | Suzuki et al. ............................ | 382/56 |
| 5,151,954 | 9/1992 | Takai et al. .............................. | 382/41 |
| 5,195,180 | 3/1993 | Takakura et al. ....................... | 395/164 |
| 5,204,664 | 4/1993 | Hamakawa ............................. | 340/703 |
| 5,392,362 | 2/1995 | Kimura et al. ........................... | 382/9 |
| 5,680,477 | 10/1997 | Asada ...................................... | 382/169 |

FOREIGN PATENT DOCUMENTS

| | | |
|---|---|---|
| 0358498 | 3/1990 | European Pat. Off. . |
| 0486155 | 5/1992 | European Pat. Off. . |
| 0508626 | 10/1992 | European Pat. Off. . |
| 9304461 | 3/1993 | WIPO . |

OTHER PUBLICATIONS

IBM Tech Disclosure Bulletin, vol. 30, No. 7, Dec. 1987, pp. 56–58, "Enlarged Character Smoothing using 2x2 Look–Up Tables": Breaks characters into 2x2 matrices to enable smoothing when enlarging.

IBM Tech Disclosure Bulletin, vol. 32, No. 10B, Mar. 1990, pp. 465–468, "Display Double Size Characters on PC": Displaying double–height characters by successive lines alternating between upper and lower halves of characters.

Primary Examiner—Mark K. Zimmerman
Assistant Examiner—Ronald Laneau
Attorney, Agent, or Firm—Steven S. Rubin

[57] ABSTRACT

A method and apparatus are disclosed for the coding of digital images for subsequent display by an apparatus having multiple image planes, wherein each image plane provides a unique information density. Accordingly, when an image feature is to be encoded, a determination is made as to whether it is possible to encode the image feature in a relatively lower density image plane or whether the feature must be encoded in a higher density image plane. A decoding system is likewise provided to interpret the encoded information for display on a display apparatus having multiple image planes.

12 Claims, 3 Drawing Sheets

DIGITAL IMAGE CODING

BACKGROUND OF THE INVENTION

1. Field of the Invention

The present invention relates to encoding of computer generated images and in particular, but not exclusively, for encoding animated scenes presented on interactive systems.

Such systems need to operate in real-time whilst producing acceptable quality images. Within the constraints of consumer systems, where cost limits the available processor power, techniques for efficiently coding image planes are required to enable real time recreation of images from a limited data stream. In the case of compact disc based systems, the disc typically outputs a 150 Kb per second data stream of which 20 Kb is reserved for sound. At a visually acceptable screen refresh rate, this allows around 8Kb per image frame for image coding.

2. Description of the Related Art

Various techniques have been proposed for reducing the information needed to code an image frame including separating an image into areas of relatively high and relatively low spatial density with a more complex, information-intensive, coding being applied to detailed higher density areas of the image than is applied to the lower density areas. Such a technique is described in EP-A-0358498 which also reduces data requirements by coding the lower resolution (video chrominance) components at half the rate of the higher resolution (luminance) components, that is to say for each display pixel, the chrominance information will be refreshed in every other image frame whereas the luminance information is refreshed every frame.

SUMMARY OF THE INVENTION

It is an object of the present invention to provide inter alia a method of encoding image data with reference to image information density which allows for relatively simple recombination of image features at decoding.

In accordance with the present invention, there is provided a method of encoding a digitised image for subsequent display by a character-based display apparatus, the method may include (a) dividing the image into an array of character blocks;

(b) for each unique character block in the image, generating a character definition for supply to display apparatus;

(c) generating for storage in a display memory of the display apparatus, a character reference for each block of the image, each character reference defining appearance of that block by reference to a character definition generated in step (b), Such that, for display by an apparatus having at least first and second character-based image planes, having a higher and lower information density respectively, the steps (b) and (c) include determining for each single character block whether the block can be represented at the lower information density and, if so, choosing to generate a character definition and character reference for a second image plane of the display apparatus.

The image to be encoded may be part of an image sequence such that in the step (b) a character block may be judged unique if an appropriate character definition is not already present in the display apparatus by virtue of an identical character block occurring elsewhere in the present image or in a previous image of the sequence. Where the image to be encoded is part of an image sequence, in the step (c), character references may be generated for updating the display memory as necessary to represent changes from a previous image in the sequence.

Each character definition may define colours for individual pixels of a block by reference to entries in a colour look-up table (palette) stored within the display apparatus. In such a case, a palette for a first image plane would have more entries than the palette for the second image plane. Additionally, the step (b) may further include determining whether colours of pixels in the unique character pattern will already be available in a palette stored in the display apparatus: if not, a palette definition may be generated for supply to the display apparatus. Where palettes are used, the display apparatus may be suitably arranged to store multiple palettes for at least one of the first and second image planes such that, in step (c), the character reference generated for each block may be accompanied by a palette reference selecting an appropriate one from the multiple palettes available.

Also in accordance with the present invention there is provided an encoder apparatus operable to receive and encode a digitised image. The apparatus may include an image divider arranged to divide a received image into an array of character blocks; a first, character definition unit coupled to the image divider and operable to generate a character definition for each block of the array; and a first character reference unit coupled to the image divider and first character definition means and operable to generate, for each block of the array, a first encoded signal specifying an appearance of a block by reference to the respective character definition, such that the apparatus further include a second character definition unit and a second character reference unit coupled together and coupled to the image divider and operable to generate a second encoded signal specifying the appearance of a block at a lower resolution than the first character definition and reference unit, and selection unit coupled to the image divider and operable to determine, for each block of an image array, whether a first or second encoded signal is to be generated.

Suitably the character definition unit are each operable to generate one or more colour look-up tables (for supply with the encoded signal to the receiving apparatus) with the character reference unit being arranged to specify block appearances as including at least an address for a respective look-up table. The character reference unit (the respective information density encoding stages) may suitably respectively specify appearances as four bit or two bit codes, and these codes may specify addresses for 16 and 4 colour look-up tables respectively.

The present invention still further provides an encoded sequence of images, each of which has been encoded by the method described above. The image sequence may be suitably recorded on a removable data carrier, such as an optical disc, or may be transmitted over a local area or broadcast network to one or more remote receivers.

A preferred embodiment of the present invention will now be described by way of example only, and with reference to the accompanying drawing.

DETAILED DESCRIPTION OF THE PREFERRED EMBODIMENT(S)

A common technique for coding images is block coding, where the dots (pixels) in the image are split into rectangular blocks of pixels. Various compression techniques such as DCT (discrete cosine trans-formation) coding can then be used to perform data compression. This compression may be needed to permit transmission over a communications link of restricted bandwidth or to allow storage on a medium such as compact disc where there is a limit on the rate at which data from the disc can be accessed. There may also be a limit on storage space available for a sequence of images on storage media such as compact disc.

In the following example, the image is divided into blocks of 8×8 pixels. Another size could equally well be used and the shape could be rectangular instead of square. In this case, data compression is achieved by re-using blocks where the same pattern appears in two or more blocks in the image, and by re-using blocks where the same block is used in consecutive frames of a moving image sequence. Whilst each pixel within the block may be coded as a direct representation of the colour, such as RGB or YUV, it is preferred to use the colour look-up table (CLUT) technique where the block is coded as the address to the appropriate colour as stored in a separate table. This reduces the amount of information to be coded per block and gives further compression.

In the present system, a limit is placed on the number of colours that may be present within each coding block. If the block has 4 bits of storage available per pixel then there can be a maximum of 16 colours used within that block. A programmable hardware look-up table is used to translate these 16. codes to actual colour specifications.

Figure 1:
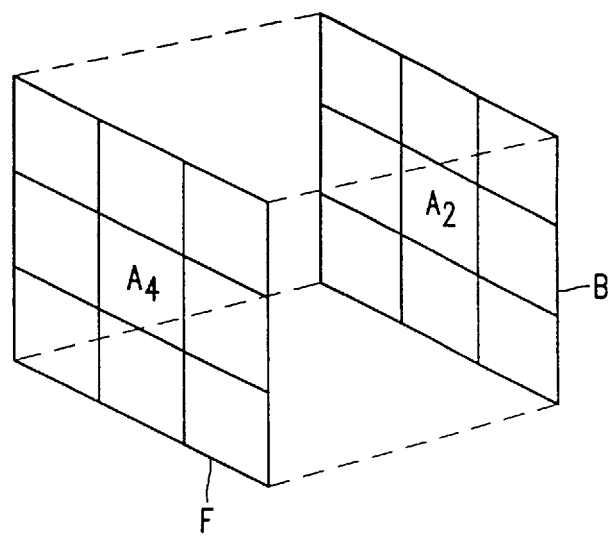
FIG. 1 represents an overlaid pair of image planes.

In the system, there are multiple display planes which are overlaid to produce the displayed image. Referring initially to FIG. 1, the following example describes the case of a 4 bit plane F in front of a 2 bit plane B with the front plane capable of being rendered transparent for some character blocks or parts of blocks. To further increase the flexibility of colour choice, a number of CLUTs are available to be specified by each block.

In order to reduce the amount of data to be coded, blocks (e.g block A) in the image which only need a small number of colours are coded in the 2 bit plane B (block $A_2$). In these cases, the foreground 4 bit plane character (block $A_4$) would be set to be transparent. When there is too much complexity in the block for the 2 bit plane to be acceptable or where the colours required are not available in the set of 2 bit plane CLUTs, then a 4 bit plane character ($A_4$) is used. No data is then needed for the 2 bit plane since the 4 bit plane will not be transparent.

Figure 2:
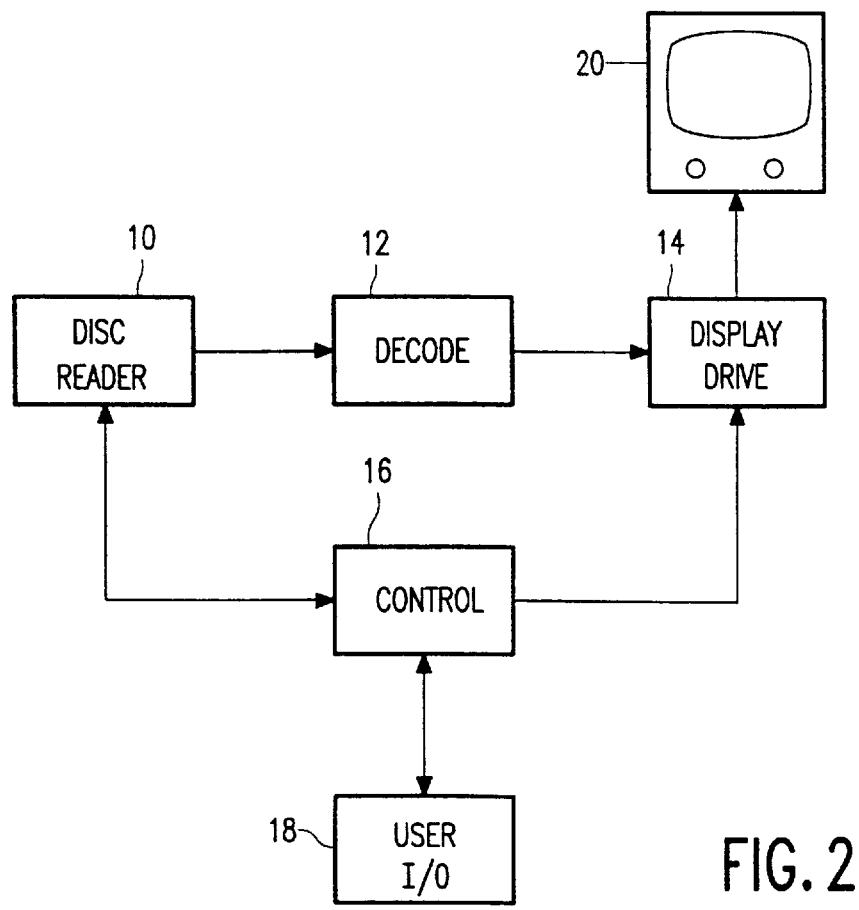
FIG. 2 represents an interactive graphics decoder apparatus.

FIG. 2 shows, in simple diagrammatic form, an interactive system having a disc reader 10 (or other stored data reader) which reads out to a decoder stage 12, the output of which is passed to display driver 14 under control of control unit 16. In a practical realization, these units may be provided in a single unit with the decoder stage 12 configured to handle the encoding technique of the present invention, as will be described below. A user input/output device 18 such as a keyboard, mouse or joystick is also provided for the supply of user commands to control unit 16 together with a display 20 such as a television or monitor screen displaying the output of display driver 14.

Figure 3:
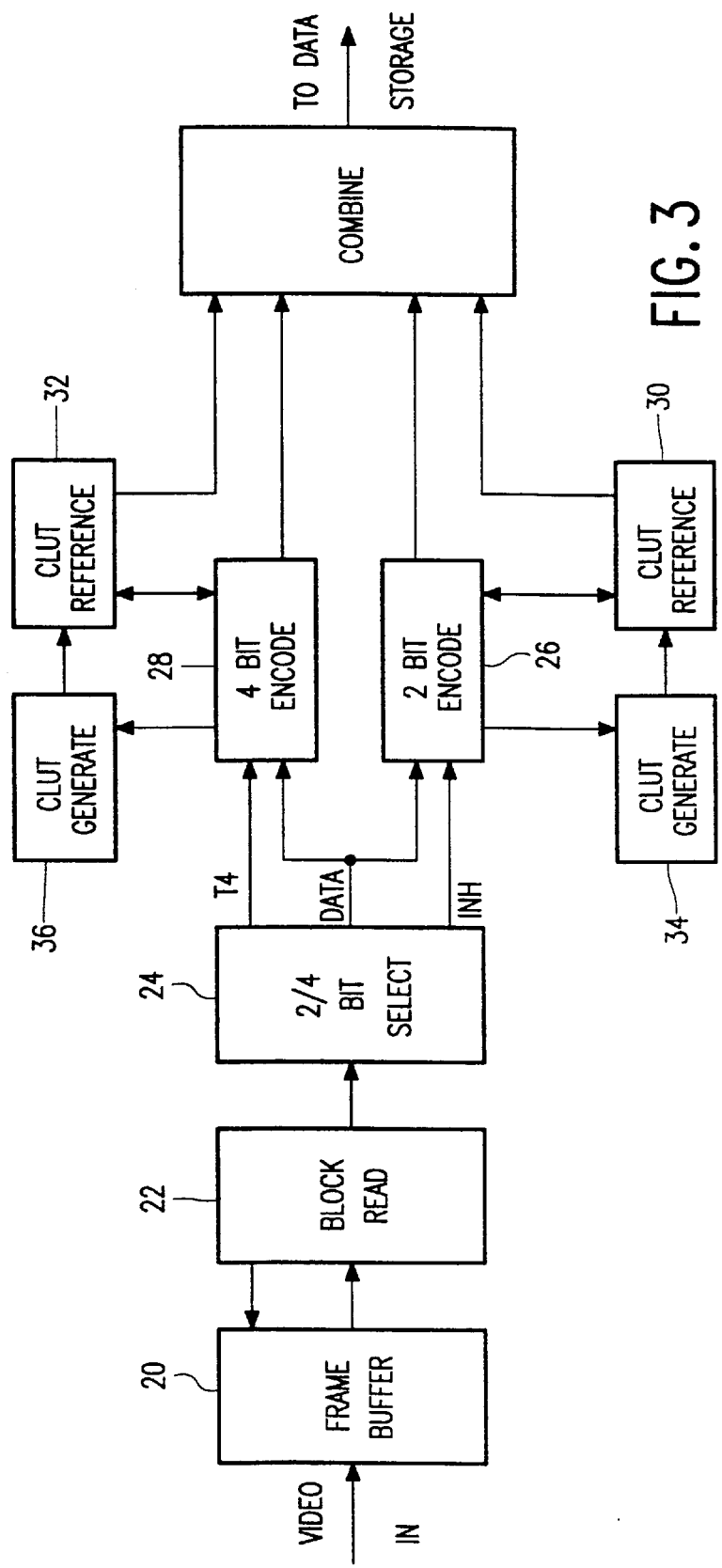
FIG. 3 is a block schematic diagram of an encoder apparatus embodying the invention.

A suitable hardware form of encoder apparatus is shown in FIG. 3: in practice the encoding may be performed as an off-line process effected in software running on a suitably programmed computer in which case the block schematic of the Figure should be considered as a flow chart running from left to right. A video signal to be encoded is read into a frame buffer 20 from which those pixels forming each block are read (block reader 22). The data for each block is passed to a selector 24 which performs a thresholding operation on that data to determine whether the block can be encoded in 2 bits or whether 4 bits will be required. Following this determination, the block data is passed to each of a 2 bit encoder stage 26 and a 4 bit encoder stage 28. With the 4 bit plane in front of the 2 bit plane, where the block is to be encoded in the 2 bit plane, a transparency signal Ty is sent from the selector 24 to the 4 bit 10 encoder causing the block to be coded as transparent in the 4 bit plane. Where the block is to be encoded in the 4 bit plane, an inhibit signal INH is sent to the 2 bit encoder to prevent any encoding of the block (as unnecessary due to the opacity of the foreground 4 bit plane block).

Rather than encode the separate colour values for each block, a colour look-up table is used with the appropriate CLUT entry address being encoded.

For each of the encoder stages 26,28 there is a corresponding CLUT reference store 30,32 respectively through which the encoder determines an appropriate address value. Where more than one possible CLUT is supported per plane, the encoder and reference store determines whether there is an exact or usable match between a required CLUT and an existing one. A usable match occurs where an existing CLUT has one or more unused colour values which may be modified to meet the requirements of a new block. Where no suitable CLUT exists a table generator 34,36 provides further tables as required to a respective reference store. The generator 34,36 may simply include a library of possible CLUT arrangements with an ability select one of the possible arrangements on the basis of the colour of the block to be encoded, or a library of possible colours to be entered in unused CLUT structures.

Following encoding, the block data is combined into a bit stream together with data specifying the CLUTs. Suitably the CLUT data is in the form of an update, that is to say CLUT data for only those tables not used by a preceding frame is sent.

Figure 4:
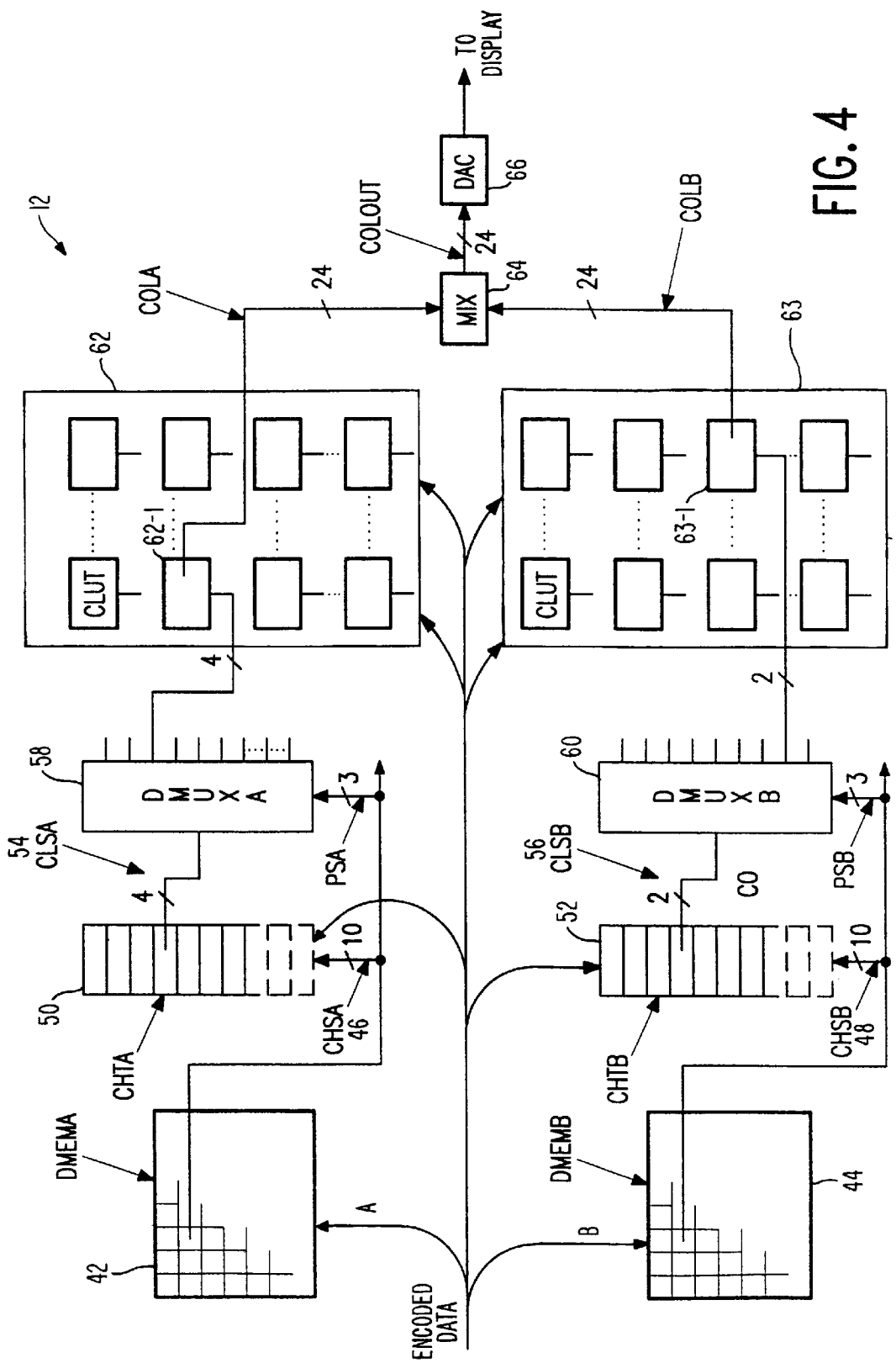
FIG. 4 is a block schematic diagram of the decoder stage of FIG. 2.

A suitable architecture for a decoder is shown in FIG. 4 to illustrate how the encoded data is converted to a display signal. Two similar sections, the components of which are suffixed A or B, handle decoding of the 4 bit and 2 bit planes respectively with the outputs of the A and B channels overlaid by mixer MIX 64, the output of which is converted to an analogue signal via digital to analogue converter DAC 66 and then passed to a display (display driver 14 and screen 20, FIG. 2).

For each channel a display memory DMEM (DMEMA 42 and DMEMB) 445 stores the character code addresses and other information for each block of the image: for a 256×224 pixel display, divided into 8×8 blocks, a grid of 32×28 blocks is stored. As it is required, each block is read out of the respective DMEM providing an address (CHSA 46 and CHSB 48) to a respective character memory (CHTA 50 AND CHTB 52). The character memory, like DMEM is updated in the At blanking interval between frames with those values not contained in the previous frame of a moving image sequence over-writing those values not required in the present frame.

The respective output of the character memory is passed to a (CLSA 54 or CLSB 56) respective demultiplexer DMUX (DMUXA 58 or DMUXB 60) which is controlled by a switching signal (PSA and PSA) also output from the display memory to select the appropriate colour look-up table, in this example, CLUT 62-1 or CLUT 63-1 from a number of available colour look-up tables CLUT 62-1-n and 63-1-n, in CLUT stores 62 and 63, respectively. The output of the demultiplexer is an address selecting the appropriate colour from the chosen CLUT. The output of the chosen CLUT, COLA or COLB, is passed to a mixer MIX 64 as previously described.

A suitable technique for providing transparency is to specify "transparent" as one of the available colours stored in a CLUT. In such a case, it is preferable to have the 4 bit plane in front of the 2 bit plane with the CLUT for one or more of the 4 bit planes storing transparent together with 15 colour values, and with the 2 bit CLUT storing 4 colour values. If the transparency mechanism allows just part of a foreground block to be transparent, then it may be possible to make these choices on parts of a block, although this will require extra coding to divide each of the 8×8 blocks into, for example, four 4×4 bit blocks.

As will be appreciated, those image blocks which are coded as 2 bit blocks will occupy only half the storage space and transmission time of those using 4 bit coding. At the same time, there is the flexibility to use the 4 bit coding to deal with more complex parts of the image. Clearly, the choice of 2 bits or 4 bits is only one of many possible configurations of planes and there could also be more than two planes involved. The planes could have other combinations of numbers of bits and could be in a different display order (for example the 2 bit plane could be in front of the 4 bit plane). From reading the present disclosure, other modifications will be apparent to persons skilled in the art. Such modifications may involve other features which are already known in the design, manufacture and use of image transmission and storage systems, display apparatuses and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same the technical problems as does the present invention. The applicants hereby give notice that new claims may be formulated to such features and/or combinations of features during the prosecution of the present application or of any further application derived therefrom.

I claim:

1. A method of encoding a digitized image for subsequent display by a character-based display apparatus, the method comprising the steps of:

(a) dividing the digitized image into an array of character blocks;

(b) for each unique character block of the array of character blocks in the digitized image generating a character definition for supply to the character-based display apparatus;

(c) generating, for storage in a display memory of the character-based display apparatus, a character reference for said each unique character block of the digitized image, each character reference defining an appearance of that unique character block by reference to a character definition generated in step (b), such that, for display by said character-based display apparatus having at least first and second character-based image planes, having a higher and lower information density respectively, the steps (b) and (c) include determining for each single character block whether the single character block can be represented at the lower information density and, if so, choosing to generate a character definition and a character reference for the second character-based image plane of the character-based display apparatus.

2. A method as claimed in claim 1, wherein:

the digitized image to be encoded is part of an image sequence and in step (b), a character block is judged unique if an appropriate character definition is not present in the character-based display apparatus due to an identical character block occurring elsewhere in the present image or in a previous image of the image sequence.

3. A method as claimed in claim 1, wherein the image to be encoded is part of an image sequence and step (c), character references are generated for updating the display memory as necessary to represent changes from a previous image in the image sequence.

4. A method as claimed in claim 1, wherein:

each character definition defines colours for individual pixels of a block by reference to entries in a colour look-up table stored within the display apparatus, a colour look-up table for the first character-based image plane having more entries than a colour look-up table for the second character-based image plane.

5. A method as claimed in claim 1, wherein step (b) further comprises determining whether colours of pixels in the unique character block will be available in a palette stored in the character-based display apparatus and, if not, generating a palette definition for supply to the character-based display apparatus.

6. A method as claimed in claim 4, wherein:

the character-based display apparatus can store multiple colour look-up tables for at least one of the first and second character-based image planes; and in step (c), the character reference generated for said each unique block is accompanied by a colour look-up table reference selecting an appropriate colour look-up table from the multiple colour look-up tables available.

7. An encoder apparatus operable to receive and encode a digitized image, the apparatus comprising:

an image divider arranged to divide a received image into an array of character blocks;

first character definition means coupled to the image divider and operable to generate a respective first character definition for each character block of the array of character blocks;

first character reference means coupled to the image divider and the first character definition means and operable to generate, for each character block of the array, a respective first encoded signal specifying a respective first appearance of the respective character block by reference to the respective first character definition;

second character definition means coupled to the image divider and operable to generate a respective second character definition for each character block of the array of character blocks;

second character reference means coupled to the image divider and the second character definition means and operable to generate, for each character block of the array, a respective second encoded signal specifying a respective second appearance of the respective character block at a lower resolution than the respective first appearance; and selection means coupled to the image divider and operable to determine, for each respective character block of the array, whether the respective first or second encoded signal is to be generated.

8. Apparatus as claimed in claim 7, wherein the first and second character definition means are each operable to generate one or more colour look-up tables, and the first and second character reference means are arranged to specify the respective first and second appearances of a block as including an address for a respective look-up table.

9. Apparatus as claimed in claim 7, wherein the first and second character reference means are arranged to specify appearance as a four-bit code and as a two-bit code respectively.

10. An image sequence signal, each image of which is encoded by a method as claimed in claim 1.

11. An image sequence signal as claimed in claim 10, recorded on a removable data carrier.

12. A apparatus for encoding a digitized image comprising:

an image divider for dividing said image into blocks;

an encoder;

at least a first and second image reference used in encoding said blocks;

said first image reference having a lower image resolution capability than said second image reference; and a selector for determining whether a block of said image can be encoded by said first image reference.

* * * * *